United States Patent
Fischer et al.

(10) Patent No.: US 9,736,021 B2
(45) Date of Patent: Aug. 15, 2017

(54) NETWORK DEVICE AND METHOD FOR OPERATING A NETWORK DEVICE FOR AN AUTOMATION NETWORK

(71) Applicants: Kai Fischer, Baldham (DE); Jürgen Gessner, Forstinning (DE); Angela Schattleitner, Tuntenhausen (DE)

(72) Inventors: Kai Fischer, Baldham (DE); Jürgen Gessner, Forstinning (DE); Angela Schattleitner, Tuntenhausen (DE)

(73) Assignee: Siemens Aktiengesellschaft, München (DE)

( * ) Notice: Subject to any disclaimer, the term of this patent is extended or adjusted under 35 U.S.C. 154(b) by 459 days.

(21) Appl. No.: 13/931,890

(22) Filed: Jun. 29, 2013

(65) Prior Publication Data
US 2014/0006574 A1    Jan. 2, 2014

(30) Foreign Application Priority Data

Jun. 29, 2012  (DE) .......... 10 2012 211 306
Jul. 16, 2012  (DE) .......... 10 2012 212 412

(51) Int. Cl.
G06F 15/177    (2006.01)
H04L 12/24     (2006.01)
H04L 29/06     (2006.01)

(52) U.S. Cl.
CPC ............ *H04L 41/082* (2013.01); *H04L 63/20* (2013.01)

(58) Field of Classification Search
CPC ... H04L 41/082; H04L 63/20; H04N 1/00127; G06F 12/0873; G06F 17/3048;
(Continued)

(56) References Cited

U.S. PATENT DOCUMENTS 5,987,605 A * 11/1999  Hill .......... G06F 9/441
                                            713/100
6,854,055 B1    2/2005  Stinus et al.
(Continued)

FOREIGN PATENT DOCUMENTS

CN      1293398 A      5/2001
DE   102005018910 A1   10/2006
(Continued)

OTHER PUBLICATIONS

European Search Report dated Oct. 8, 2013 for correspondingEuropean Patent Application No. 13171683.9 with English translation.
(Continued)

*Primary Examiner* — Liangche A Wang
*Assistant Examiner* — Kaylee Huang
(74) *Attorney, Agent, or Firm* — Lempia Summerfield Katz LLC

(57) ABSTRACT

A network device and a method for operating a network device for an automation network are provided. The network device is set up with the help of a real-time application for providing a function of the network device. The real-time application has at least one predefined, updatable parameter. The network device has a storage device for storing update data for the updatable parameter in an update storage area and storing application data for the real-time application in an application storage area. The network device is set up such that, after update data has been written into the update storage area at a predefined update time, a first memory address referring to the application storage area switches to a second memory address referring to the update storage area in which the update data is stored. The switch takes place deterministically within a predefined update timeslot during runtime of the real-time application.

18 Claims, 4 Drawing Sheets

(58) Field of Classification Search
CPC ............... G06F 21/78; G06F 2212/154; G06F 17/30345; G06F 11/3409; G06G 3/0683
USPC ................ 709/201, 203, 220, 221, 223, 224
See application file for complete search history.

(56) References Cited

U.S. PATENT DOCUMENTS

| | | |
|---|---|---|
| 7,680,978 B1* | 3/2010 | Narayan et al. .............. 711/108 |
| 8,266,703 B1* | 9/2012 | Magdych et al. .............. 726/25 |
| 2004/0150519 A1* | 8/2004 | Husain et al. ................ 340/506 |
| 2004/0153171 A1* | 8/2004 | Brandt ................... G05B 15/02 700/9 |
| 2005/0177708 A1 | 8/2005 | Stinus et al. |
| 2007/0053308 A1 | 3/2007 | DuMas et al. |
| 2007/0169080 A1* | 7/2007 | Friedman ..................... 717/168 |
| 2009/0217023 A1* | 8/2009 | Griech et al. ..................... 713/2 |
| 2011/0138177 A1* | 6/2011 | Qiu et al. ...................... 713/168 |
| 2011/0173691 A1* | 7/2011 | Baba .................... H04L 9/3263 726/10 |

FOREIGN PATENT DOCUMENTS

| | | |
|---|---|---|
| EP | 1108984 | 6/2001 |
| WO | 2008022606 | 2/2008 |

OTHER PUBLICATIONS

German Office Action dated Mar. 15, 2013 for corresponding GermanPatent Application No. DE 10 2012 212 413.8 with English translation.
Chinese Office Action for Chinese Patent Application No. 201310265630.7 mailed Oct. 9, 2016.

\* cited by examiner

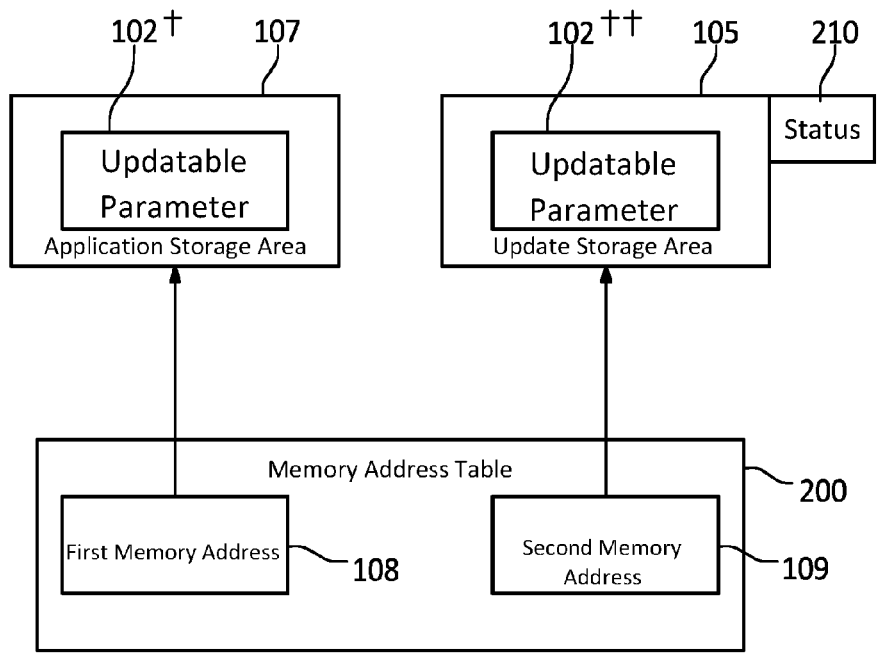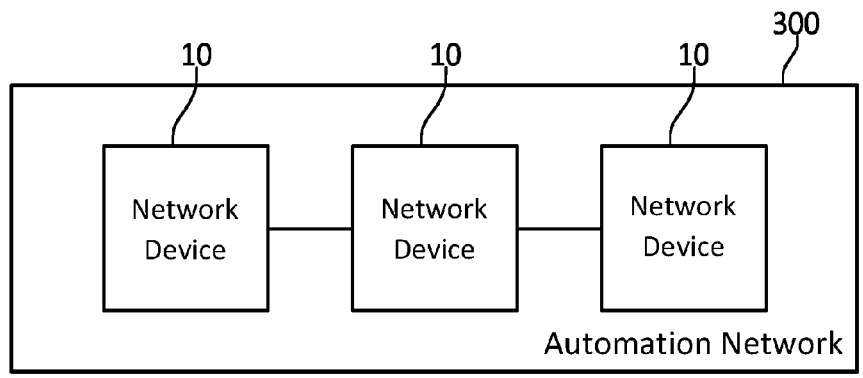

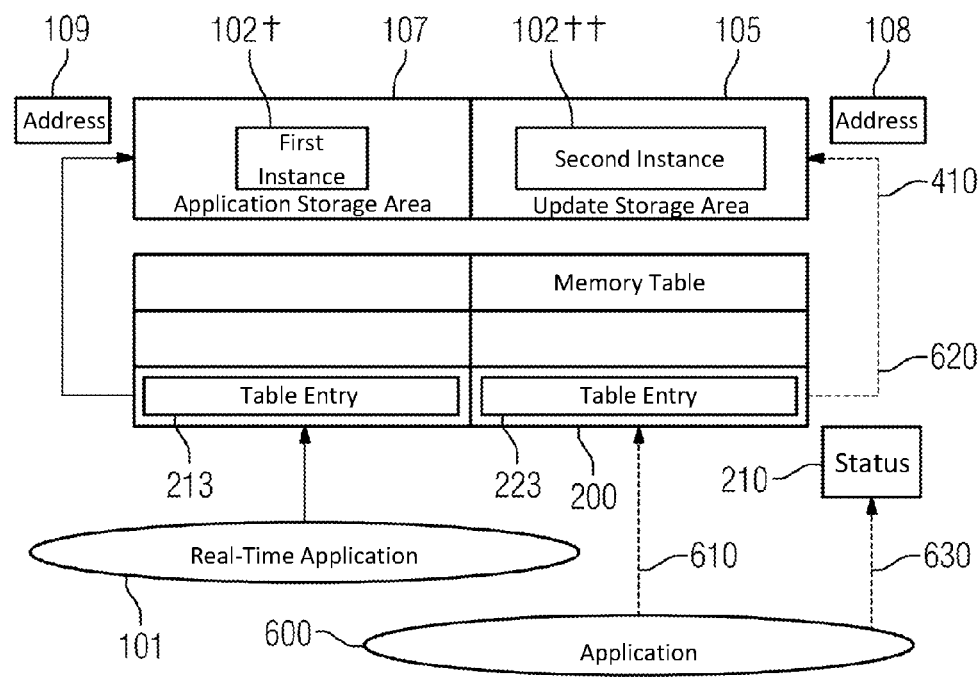
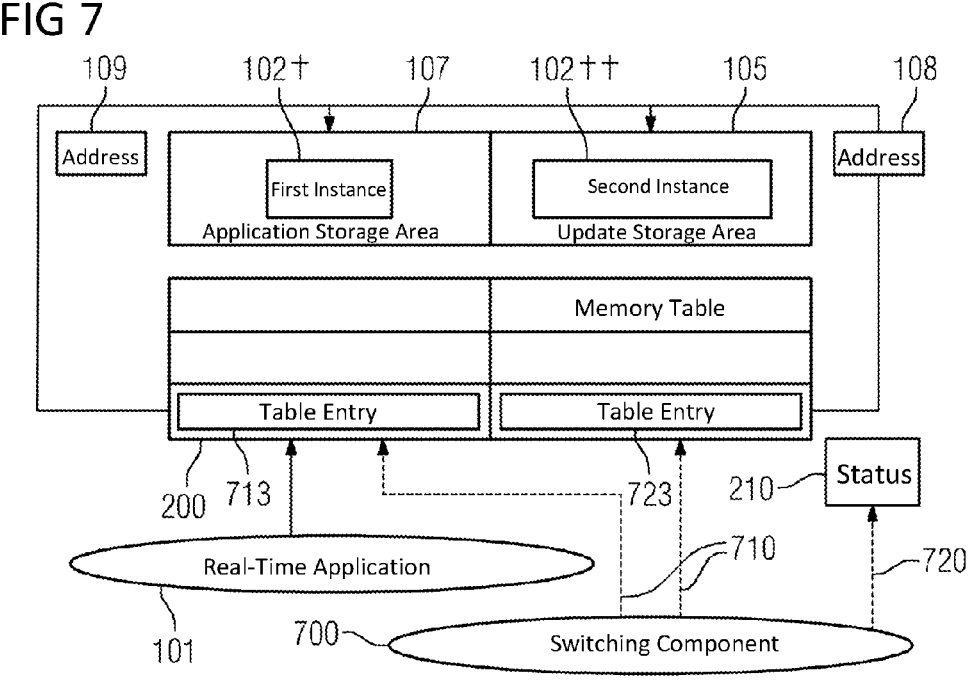

NETWORK DEVICE AND METHOD FOR OPERATING A NETWORK DEVICE FOR AN AUTOMATION NETWORK

This application claims the benefit of DE 10 2012 211 306.1, filed on Jun. 29, 2012, and DE 10 2012 212 412.8, filed on Jul. 16, 2012, which are hereby incorporated by reference.

BACKGROUND

The present embodiments relate to a network device and a method for operating a network device for an automation network.

Intelligent field devices and controllers in an automation network communicate both deterministically via synchronous and asynchronous real-time communication as well as by non-deterministic methods (e.g., using the object linking and embedding for process control (OPC) protocol). Most control programs for such field devices and controllers are designed and compiled with a standardized programming language (e.g., according to IEC Standard 61131). The interaction of field devices and the control in a controller, for example, is configured with an engineering tool such as Step7 and also with the respective device descriptions. In this way, deterministic real-time applications are planned and implemented with exact timing in order thereafter to be loaded onto the field device. Subsequent modification of this real-time application or of the corresponding application image for a field device or a controller (e.g., via the OPC device communication) may not be provided.

To facilitate the modification of configurations or software lifecycle management of real-time applications in field devices and controllers, the real-time application running in the devices may be deactivated, or the field device itself may be deactivated. Alternatively, the system concerned may be reconstructed. In each case, the function of the real-time application in question is significantly affected.

For conventional, non-real-time embedded devices in embedded systems, it is known for a switching to take place from one to another image of the real-time application. Alternatively, the switching may take place from one storage area to another. In such a case, the field device concerned may be rebooted when updated by such an image exchange.

Conventional operating systems used in the office environment, such as Windows or Linux, allow certain operating system updates or updates of virus signatures to be carried out while the system is in operation, and allow the system to continue to be used without restarting. However, these are not safety-critical, real-time applications, as is often the case with field devices.

For updating of key material in embedded devices, mechanisms are known in which two sets of requisite keys are provided in parallel, these having a validity period assigned. When one key set expires, a second key set is activated. The expired key set is updated without real-time requirements and is available when the currently valid key set expires. Such a process is, for example, standardized in the building automation control network (BACnet) protocol for BACnet security. BACnet is supported by building automation or risk management devices.

SUMMARY AND DESCRIPTION

The scope of the present invention is defined solely by the appended claims and is not affected to any degree by the statements within this summary.

In the conventional systems and methods, deterministic methods are not used for updating applications with real-time capability.

The present embodiments may obviate one or more of the drawbacks or limitations in the related art. For example, an improved network device and an improved method for operating a network device for an automation network with real-time requirements are provided.

A network device for an automation network is provided. The network device is set up with the help of a real-time application for providing a function of the network device. The real-time application has at least one predefined, updatable parameter. The network device has a storage device for storing update data for the updatable parameter in an update storage area and for storing application data for the real-time application in an application storage area. The update storage area and the application storage area are separate from one another. The network device is set up such that, after update data is written into the update storage area at a predefined point in time, a first memory address referring to the application storage area switches to a second memory address referring to the update storage area in which the update data is stored. The switch takes place deterministically within a predefined time slot, during runtime of the real-time application.

The network device may, for example, be a field device. Field devices are connected with a control and management system, for example, via a field bus or via a real-time Ethernet connection. Data generated by the field device is evaluated in the control and management system, for example. This data is used for regulation, control and further processing. High demands are placed on such field devices in terms of efficiency, robustness and availability.

A method for operating a network device for an automation network is further proposed. The network device is set up with the help of a real-time application for providing a function of the network device and has at least one predefined, updatable parameter. The method includes storing update data for the updatable parameter in an update storage area and storing application data for the real-time application in an application storage area. The update storage area and the application storage area are separate from one another. The method also includes the writing of update data for the updatable parameter into the update storage area, and a switch from a first memory address referring to the application storage area to a second memory address referring to the update storage area in which the update data is stored after the update data is stored in the update storage area at a predefined update time. The switch takes place deterministically within a predefined update timeslot during the runtime of the real-time application.

The proposed network device and the proposed method enable an updatable parameter of a real-time application in a network device such as, for example, a field device to be updated during runtime (e.g., executed during the real-time application without interrupting or terminating the real-time application). Thus, for example, modifications to the configuration of the network device and the real-time application by installation of operating system patches or signature lists of virus patterns or by updating of cryptographic keys or expired certificates, attack signatures or rule bases of firewalls and intrusion detection systems (IDS) as update data in a field device may be provided without powering down and restarting the field device and/or without ending and restarting the real-time application executed on the field device.

The updatable parameter is predefined. The updatable parameter may include, for example, variables of the real-time application that have been planned and defined in advance, for which an update during runtime of the real-time application may be provided. The defined variables are provided, for example, for the configuration amendments and updates listed above.

The real-time capability of the network device and/or of the method, or the suitability of the method, for updating a real-time application during runtime, further results from the fact that the change is undertaken in timing cycles that are predefined, firmly scheduled and precisely matched with regard to the runtime expenditure of an update application executing the update. In this context, "deterministically" provides, for example, that the steps for updating the updatable parameter are specified in full and analyzed with regard to runtime, so that a suitable dimension for the update timing cycles may be selected as part of the overall planning of the cycle time when the real-time application is still in the planning phase. The update timing cycles are scheduled within the cycle time of the real-time device. A suitable analysis is, for example, an analysis of the maximum runtime or execution time (e.g., worst case execution time (WCET)) of the update application concerned.

The update storage area and the application storage area are separate from one another. This provides, for example, that each of the two storage areas is assigned its own address space or address area with memory addresses reserved solely for the storage area. In one embodiment, the real-time application has exclusive access to the application storage area. Conversely, for example, access to the update storage area may be provided only for the update application. Access for the real-time application and for the update application is facilitated by the memory addresses, which refer respectively to the update memory or to the application memory.

In further embodiments of the network device and/or of the method, a first instance of the updatable parameter is stored in the application storage area, and a second instance of the updatable parameter is stored in the update storage area during runtime of the real-time application.

This enables an update application that may not have real-time capability to carry out updates or modifications to the second instance of the updatable parameter, while the real-time application is not impaired and continues to access the first instance of the updatable parameter. Only when the update application has completed the modification of the updatable parameter is the real-time application given access to the second instance of the updatable parameter, instead of continuing to access the first instance, which is now no longer current, of the updatable parameter. This makes it possible for a real-time-capable, efficient update to be carried out on the real-time application and/or on the updatable parameter in the network device.

In further embodiments of the network device and/or of the method, the network device includes a memory address table for storing the first memory address and the second memory address.

The memory address table permits efficient administration and efficient access to the application memory and the update memory.

In further embodiments of the network device and/or of the method, the network device is set up such that, after the update data is written into the update storage area, any status information for a status of the update storage area is modified, and such that the first memory address is switched to the second memory address as a function of the status information.

The status information may be used advantageously to synchronize the switch from the first memory address to the second memory address such that the update application first finishes all updates of the updatable parameter, before the memory addresses are changed. This prevents any memory addresses being switched before the update is completed. The status information therefore serves as a signal or flag to indicate that the update is complete.

In further embodiments of the network device and/or of the method, the network device includes an access protection device that is set up to protect an access to the status information.

Protecting access to the shared storage areas makes it possible to provide, for example, in the case of several simultaneously running update applications, that two or more write accesses to the status information may be carried out at the same time.

In further embodiments of the network device and/or of the method, the access protection device includes one or more semaphores.

Semaphores may be suitable for managing access to shared resources.

In further embodiments of the network device and/or of the method, the storage device includes at least one further update storage area for storing update data for the updatable parameters and at least one further application storage area for storing application data for the real-time application. The at least one further update storage area and the at least one further application storage area are separate from one another. The network device is set up such that, after update data is written into the at least one further update storage area at the predefined update time, an at least one further first memory address referring to the at least one further application storage area switches to an at least one further second memory address referring to the at least one further update storage area in which the update data is stored. The switch takes place deterministically within a predefined update timeslot during runtime of the real-time application.

In this way, different storage areas may be managed and/or taken into account for an update of the updatable parameter. A predefinable sequence of updates of the different storage areas and dependencies of different storage areas and/or of individual partial updates may therefore also be provided. For example, certain partial updates may not be executed as long as or if other partial updates in other storage areas are not carried out or are still outstanding.

These dependencies may be statically defined even during the generation of the memory image of the real-time application. The dependencies may alternately also be determined dynamically at runtime, whereby, for example, one storage area describes logical dependencies to other storage areas. Whether a parameter may be updated and whether a specific update sequence is to be maintained may be defined, for example during the programming and image generation of the real-time application.

In further embodiments of the network device and/or of the method, the network device is configured (e.g., set up) such that, after the update data is written to the at least one further update storage area, at least one further item of status information for a status of the at least one further update storage area is changed, and such that the switching of the at least one further first memory address to the at least one further second memory address takes place as a function of the at least one further item of status information.

The switching of the memory addresses may thus be synchronized accordingly, even if there is a plurality of updates in a plurality of storage areas.

In further embodiments of the network device and/or of the method, the storing of the update data may be executed as a function of a predefined validity of the updatable parameter.

Thus, cryptographic keys, for example, may be assigned a validity. An update of the cryptographic keys is then provided after a corresponding validity has expired. This may, for example, be access protection or a trigger for updating the updatable parameter (e.g., the cryptographic keys).

In further embodiments of the network device and/or of the method, the updatable parameter includes cryptographic keys and/or certificates.

Both cryptographic keys and certificates are to be regularly renewed so that the protective function is not impaired. This is provided by the method of one or more of the present embodiments.

In further embodiments of the network device and/or of the method, the updatable parameter includes attack signatures and/or rule bases for a firewall and/or an intrusion detection system.

Attack signatures and rule bases are kept constantly up to date in order to protect the field device from external attacks. This is provided by the method of one or more of the present embodiments.

An automation network with a plurality of corresponding network devices is further provided. The automation network is set up to perform a synchronized and/or simultaneous update of the updatable parameter of each of the network devices during runtime.

A plurality of network devices may thus be efficiently updated, thereby helping to increase the security of operation and efficiency of maintenance of the automation network.

A computer program product that initiates the execution of a corresponding method on a program-controlled device is further provided. In one embodiment, the computer program product may be a non-transitory computer-readable storage medium including instructions executable by one or more processors of the program-controlled device for executing the method.

A computer program product, such as a computer program device, for example, may be provided or delivered from a server in a network in the form of a non-transitory computer-readable storage medium such as a memory card, USB stick, CD-ROM, DVD. Alternatively, the computer program product may be provided in the form of a downloadable file. This may, for example, be effected in a wireless communication network by the transfer of a corresponding file with the computer program product or the computer program device. A program-controlled device may, for example, be a network device, as described above.

A non-transitory computer-readable storage medium with a stored computer program with commands (e.g., instructions) executable by one or more processors to initiate the execution of a corresponding process on a program-controlled device is also provided.

Further exemplary implementations also include non-explicitly mentioned combinations of process steps, features or embodiments of the method or network device as described above or below with regard to the exemplary embodiments. Thus, the person skilled in the art may also add or modify individual aspects as improvements or additions to the respective basic form of the invention.

BRIEF DESCRIPTION OF THE DRAWINGS

FIG. 2 is a block diagram of a section of the exemplary embodiment of the network device from FIG. 1;

FIG. 3 is a block diagram of one embodiment of an automation network with a plurality of network devices;

FIG. 6 is an alternative block diagram of the section of the exemplary embodiment of the network device from FIG. 1; and FIG. 7 is an alternative block diagram of the section of the exemplary embodiment of the network device from FIG. 1.

DETAILED DESCRIPTION

Figure 1:
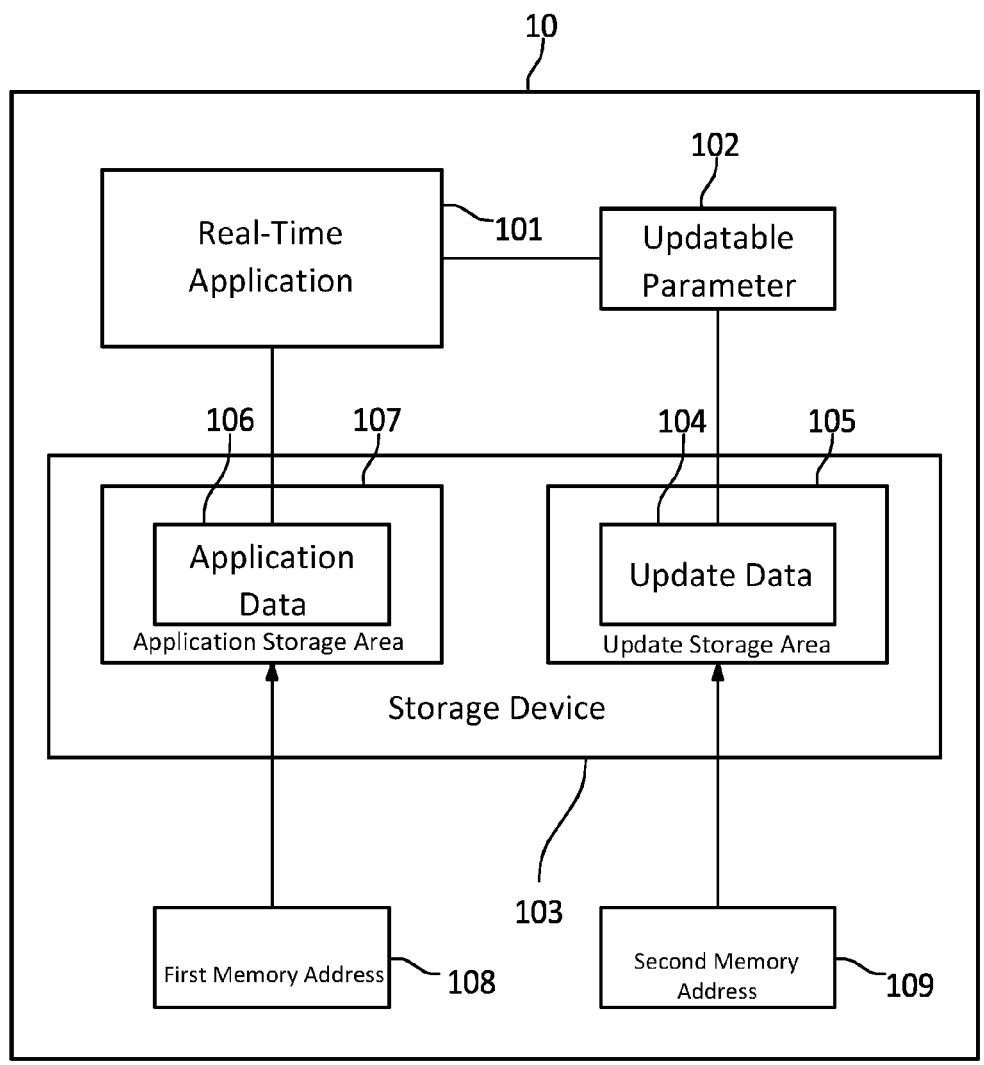
FIG. 1 is a block diagram of an exemplary embodiment of a network device.

A block diagram of an exemplary embodiment of a network device 10 is shown in FIG. 1.

The network device 10 that is suitable for operation in an automation network is set up with the help of a real-time application 101 for providing a function of the network device 10 (e.g., the management and control of a machine or mechanical device). The real-time application 101 has at least one predefined, updatable parameter 102 that may be partially or completely updated by the method during runtime of the real-time application 101 and therefore, for example, without shutting down (e.g., without terminating) the real-time application 101 and/or powering down the network device 10.

As shown in FIG. 1, the network device 10 includes a plurality of components. A storage device 103 is used for storing update data 104 for the updatable parameter 102 in an update storage area 105 and for storing application data 106 for the real-time application 101 in an application storage area 107.

Examples of application data 105 are program code for an operating system, signature lists of virus patterns, cryptographic keys, certificates, attack signatures or rule bases of firewalls and intrusion detection systems (IDS).

Examples of update data 104 are, accordingly, operating system patches, signature lists of virus patterns, cryptographic keys, certificates, attack signatures or rule bases of firewalls and IDS.

The update storage area 105 and the application storage area 107 are separate from one another, and, therefore, each of the storage areas 105, 107 represents separate address spaces or address areas. The two storage areas 105, 107 are addressed by a first memory address 108 referring to the application storage area 107 and a second memory address 109 referring to the update storage area 105 in which the update data 104 is stored.

FIG. 2 shows a block diagram of a section of an exemplary embodiment of the network device 10 from FIG. 1. For greater legibility, FIG. 2 shows only the update storage area 105 and the application storage area 107, as well as memory addresses 108, 109 referring to the two areas 105, 107. For programming purposes, the two memory addresses 108, 109 are pointers to the memory addresses of the two storage areas 105, 107 in the storage device 103 of the network device 10.

During runtime of the real-time application 101, a first instance 102I of the updatable parameter 102 is stored in the application storage area 107 and a second instance 102†† of the updatable parameter 102 is stored in the update storage area 105.

The two memory addresses 108, 109 are stored in a memory address table 200.

The variables for the updatable parameter 102 that have been planned and defined in advance and are to be updated are thus created at runtime in duplicate in the storage device 103 as first instance 102† and the second instance 102††, and are each uniquely addressed by the memory addresses 108, 109 stored in the memory table 200.

A table entry in the memory address table 200 thus includes two memory addresses. The first memory address 108 refers or points to the application storage area 107 to which the real-time application 101 has access, and the second memory address 109 refers or points to the update storage area 105, which may be accessed by an update application for updating the updatable parameter 102. The update application may not have real-time capability.

The memory referring to the application storage area 107 and the update storage area 105 thus forms a storage area for configuration data, which may also be designated as an update memory. The storage area is used by components or applications that may or may not have real-time capability.

Access to the real-time application 101 is effected for programming purposes by the memory table entry shown in FIG. 2, which refers to the first instance 102† of the updatable parameter 102.

An update application for executing the update of the updatable parameter 102 writes update data 104 into the update storage area 105. For programming purposes, this is effected by modification of the relevant variables of the second instance 102†† of the updatable parameter 102 that are to be updated.

FIG. 2 further shows an item of status information 210 for labeling of a status of the update storage area 105. This status information 210 is modified by the update application after the update data 104 is written into the update storage area 105. Alternatively, the update application may also suitably indicate the end of the writing of the update data 104 or identify the end of the writing by triggering a specific event. Access to the status information 210 is protected here by semaphores, for example.

A switching component may consequently carry out the switch from the first memory address 108 to the second memory address 109 as a function of the status information 210. This switching component may, for example, be implemented as part of the real-time application. Alternately, the switching component of the real-time application may be made available as a hard-wired function on the platform. The switching component executes the closing stage of the proposed method for the predefined updatable parameter 102.

In one embodiment, an application storage area 107, in the course of the method, may take over the role of the update storage area 105 after the swapping of the memory addresses 108 and 109, and vice versa.

The switching component may be used deterministically. Even during the planning of the real-time application 101, within each cycle, the execution time of the switching component is added to the overall cycle time, so that the overall cycle time is increased accordingly.

The access to the status information 210 is protected, for example, by semaphores, since the status information 210 to which both the switching component and the update application have access is synchronized. For example, the access to the status information 210 is to be blocked for the switching component when the update application is write-accessing the status information 210

The memory address table 200 may include further entries that refer to further storage areas used as update memory that include, in each case, a further update storage area and a further application storage area. For each of the further update memories, a corresponding further status information that is managed according to the procedure explained above is provided.

The memory address table 200 is thus used for controlled processing of one or more update memories for updating of the updatable parameter 102. The updatable parameter 102, as mentioned above, may include a number of variables to be updated. Each entry in the memory address table refers to one or more of the variables of the updatable parameter 102 that are to be updated.

FIG. 3 shows a block diagram of one embodiment of an automation network 300 with a plurality of network devices 10. The network devices 10 are connected via network connections. This automation network 300 may include further components such as, for example, control devices that are not shown in FIG. 3.

Figure 4:
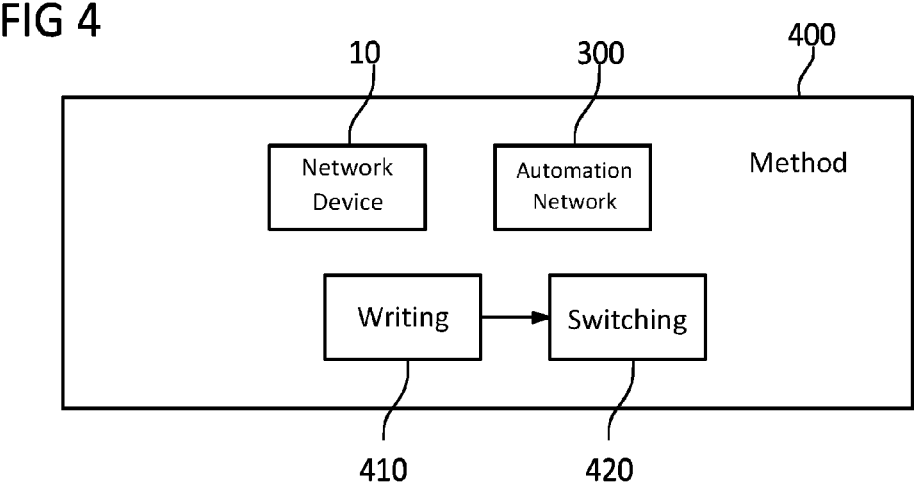
FIG. 4 is a flowchart of an exemplary embodiment of a method for operating a network device for an automation network.

FIG. 4 shows a flowchart of an exemplary embodiment of a method 400 for operating a network device 10 for an automation network 300.

The method 400 includes writing 410 of update data 104 for the updatable parameter 102 into an update storage area 105 at a predefined update time and switching 420 from a first memory address 108 referring to the application storage area 107 to a second memory address 109 referring to the update storage area 105 including the update data 104. The switch 420 is carried out after the writing 410.

Figure 5:
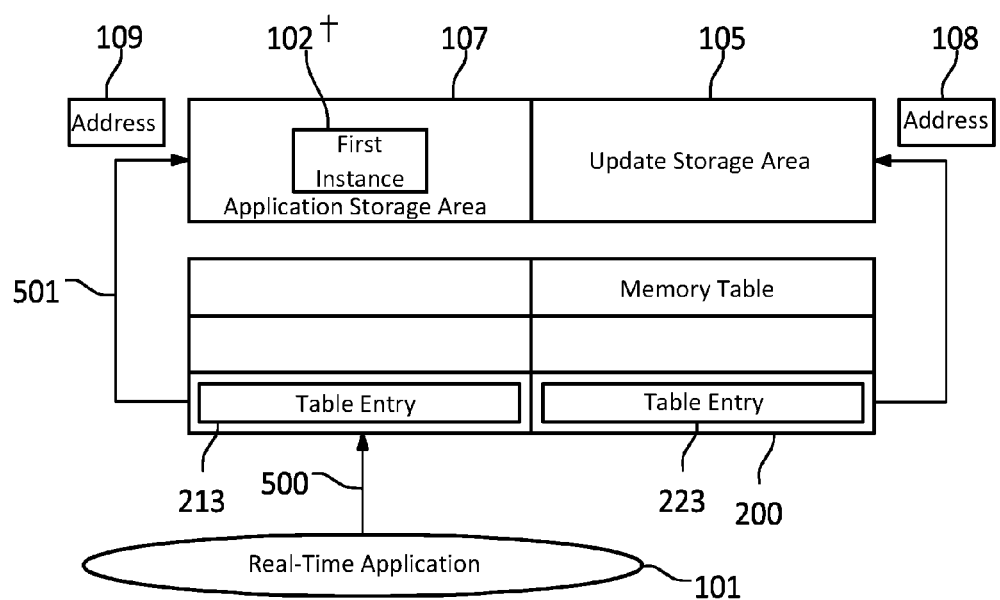
FIG. 5 is an alternative block diagram of the section of the exemplary embodiment of the network device from FIG. 1.

FIGS. 5-7 each show an alternate block diagram of the section of the exemplary embodiment of the network device from FIG. 1.

The variables of the updatable parameter 102 that are planned and defined in advance are a third object "Object 3" in FIGS. 5-7. The third object is to be updated and is thus created at runtime in duplicate in the storage device 103 as first instance 102† ("Object 3") and second instance 102†† ("Object 3—updated"), and are each uniquely addressed by the memory addresses 108 ("Adr y"), 109 ("Adr x") stored in the memory table 200.

Each table entry in the memory address table 200 includes two storage area addresses. One storage area address 109 points to a storage area to which a real-time application 101 is to have access. The other storage area address 108 points to a storage area that may be accessed by an update application may not have real-time capability. The memory address table entry for the third object includes, for example, a table entry 213 ("e.g., Adr of active Object 3: x") pertaining to the storage area address 109 and a table entry 223 ("Adr of inactive Object 3: y") pertaining to the storage area address 108. This creates a storage area for configuration data (e.g., the update memory) that is used jointly by components with and without real-time capability.

As shown in FIG. 5, the real-time application 101 (e.g., "RT application using RT Object 3") accesses the third object (e.g., "Object 3") using a table entry 213 (e.g., "Adr of active Object 3: x") pertaining to the storage area address 109 via an additional indirection. The table entry 213 pertaining to the storage area address 109 is read 500 (e.g., "read"), and the application storage area 107 is read 501 (e.g., "read") and written 501 (e.g., "write") into.

As shown in FIG. 6, any application 600 (e.g., "Update application for RT Object 3") intending to carry out an update reads 610 (e.g., "read") the table entry 223 pertaining to the storage area address 108, writes the modified data into the update storage area 105, carries out a modification 630

(e.g., "write") of an item of status information 210 and sends the status information 210 to the switching component (e.g., by a Finished Flag 620), or triggers an event when the writing 410 into the update storage area 105 is completed.

As shown in FIG. 7, a switching component 700 with real-time capability, triggered by the status information 210, which contains information about a completed update and is read and deleted 720 (e.g., "read then delete"), for example, for the update-capable storage area containing the third object, carries out a switch 710 (e.g., "switching process", "exchange") of the object addresses 108, 109 within a pair of addresses, so that a table entry 713 (e.g., "Adr of active Object 3: y") pertaining to the storage area address 108 is created, as well as a table entry 723 (e.g., "Adr of inactive Object 3: x") pertaining to the storage area address 109.

The synchronization of the status information 210 (e.g., Finished Flag), to which both the switching component and the update application have access, is to be provided by functions of the runtime environment, such as semaphores, for example. This provides that access for the switching component is to be blocked while the update component is write-accessing the flag.

The following scenarios may also be provided for the method and/or the network device.

The addition of further field devices, for example, including functions for energy monitoring or monitoring sensors, into a running automation network may be effected by an update or configuration modification according to the method if the use of such an additional field device is already provided for in the planning as being possible and has been made dependent upon a configuration parameter that is stored in the update memory.

For example, monitoring processes may record and authenticate the installation of such additional, pre-planned field devices in the automation network and write the update data into the update memory.

In addition, system variables of real-time applications, for which the system variables are to be updated during runtime, are explicitly identified as such during the engineering stage. One example is a virus scanner for industrial communication protocols, which is to be updated with a list of attack signatures. Current virus data and/or signatures, for example, are then updated as parameters to be updated. An aging and replacement algorithm developed for industry applications with limited memory space may be used for this.

For an automated renewal of cryptographic keys provided in the network device, certificate or key memories may be specially labeled as such, and thus, the process for certificate renewal may be integrated into the image of the real-time application. Current cryptographic keys and/or certificates, for example, are then updated as parameters to be updated.

A monitoring and update mechanism, which checks the expiration of stored certificates and triggers a certificate renewal in a defined period, may be present for the bootstrapping of credentials. This may occur as a result of the control, for example, by a cryptographic chip or software-based, generating a new, asymmetrical key pair and then, initially via asynchronous connections, sending a PKCS#10 certificate signing request to a certification authority. When the control receives the certificate back via the public key, the control will then write the requisite private/public keys as parameters to be updated to the updatable memory for real-time applications and replace the private/public keys by a switching process. The certification authority may take over the publication of the certificates.

The exemplary embodiments of the method and the network devices thus enable configuration modifications of running real-time applications to be carried out.

For example, updating of security associations such as, for example, symmetrical cryptographic keys or expired certificates, attack signatures or rule bases of firewalls and IDS systems, may be carried out without requiring interruption to the operation of the relevant field device. Renewed keys and/or certificates, updated attack signatures or rule bases are updatable parameters.

Inconsistencies in the execution of updates may be avoided by the setting of dependencies.

Although the invention has been illustrated and described in detail by the exemplary embodiments, the invention is not limited by the disclosed examples. Other variations may be derived therefrom by the person skilled in the art without departing from the scope of protection of the invention.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A network device for an automation network, the network device being set up with help of a real-time application for providing a function of the network device, the real-time application having at least one predefined, updatable parameter, the network device comprising:

a storage device operable to store update data for the updatable parameter in an update storage area and store application data for the real-time application in an application storage area, the update storage area and the application storage area being separate from one another;

an application memory having a first memory address referring to the application storage area; and an update memory having a second memory address referring to the update storage area, wherein the updatable parameter comprises attack signatures, rule bases for a firewall, an intrusion detection system, or a combination thereof, wherein, during runtime of the real-time application, a first instance of the updatable parameter is stored in the application storage area, and a second instance of the updatable parameter is stored in the update storage area, the first and second instances of the updatable parameter initially being the same, wherein the second instance of the updatable parameter is updated by an update application such that the update data is written into the update storage area, and wherein the network device is configured such that, after the update data is written into the update storage area at a predefined update time, the first memory address referring to the application storage area is switched to the second memory address referring to the update storage area in which the update data is stored, the switch taking place deterministically within a predefined update timeslot during the runtime of the real-time application and without ending or restarting the real-time application.

2. The network device as claimed in claim 1, further comprising a memory address table operable to store the first memory address and the second memory address.

3. The network device as claimed in claim 1, wherein the network device is configured such that, after the update data is written into the update storage area, an item of status information for a status of the update storage area is modified, and such that the first memory address switches to the second memory address as a function of the item of status information.

4. The network device as claimed in claim 3, further comprising an access protection device configured to protect an access to the item of status information.

5. The network device as claimed in claim 4, wherein the access protection device comprises one or more semaphores.

6. The network device as claimed in claim 1, wherein the storage device comprises at least one further update storage area operable to store the update data for the updatable parameter, and at least one further application storage area for storing the application data for the real-time application, the at least one further update storage area and the at least one further application storage area being separate from one another, and
wherein the network device is further configured such that, after the update data is written into the at least one further update storage area at the predefined update time, an at least one further first memory address referring to the at least one further application storage area switches to an at least one further second memory address referring to the at least one further update storage area in which the update data is stored, the switch taking place deterministically within a predefined update timeslot during the runtime of the real-time application.

7. The network device as claimed in claim 6, wherein the network device is further configured such that, after the update data is written into the at least one further update storage area, at least one further item of status information for a status of the at least one further update storage area is changed, and such that the switching of the at least one further first memory address to the at least one further second memory address takes place as a function of the at least one further item of status information.

8. The network device as claimed in claim 1, wherein the writing of the update data is executable as a function of a predefined validity of the updatable parameter.

9. The network device as claimed in claim 1, wherein the updatable parameter further comprises cryptographic keys, certificates, or the cryptographic keys and the certificates.

10. An automation network comprising:
a plurality of network devices, each network device of the plurality of network devices set up with help of a real-time application for providing a function of the network device, the real-time application having at least one predefined, updatable parameter, each network device comprising:
a storage device operable to store update data for the updatable parameter in an update storage area and store application data for the real-time application in an application storage area, the update storage area and the application storage area being separate from one another,
wherein the updatable parameter comprises attack signatures, rule bases for a firewall, an intrusion detection system, or a combination thereof,
wherein, during runtime of the real-time application, a first instance of the updatable parameter is stored in the application storage area, and a second instance of the updatable parameter is stored in the update storage area, the first and second instances of the updatable parameter initially being the same,
wherein the second instance of the updatable parameter is updated by an update application such that the update data is written into the update storage area, and
wherein the network device is configured such that, after the update data is written into the update storage area at a predefined update time, a first memory address referring to the application storage area is switched to a second memory address referring to the update storage area in which the update data is stored, the switch taking place deterministically within a predefined update timeslot during the runtime of the real-time application and without ending or restarting the real-time application, and
wherein the automation network is configured such that a synchronized, simultaneous, or synchronized and simultaneous update of the updatable parameter is to be carried out on each network device of the plurality of network devices at the runtime.

11. A method for operating a network device for an automation network, which is set up with help of a real-time application for providing a function of the network device, the real-time application having at least one predefined, updatable parameter, the method comprising:
storing a first instance of the updatable parameter in an application storage area, wherein the updatable parameter comprises attack signatures, rule bases for a firewall, an intrusion detection system, or a combination thereof;
storing a second instance of the updatable parameter in an update storage area, wherein the application storage area and the update storage area are separate from one another, and wherein the first and second instances of the updatable parameter are initially the same;
updating the second instance of the updatable parameter by an update application, therein creating update data;
writing the update data for the updatable parameter into the update storage area; and
switching, at a predefined update time, a first memory address referring to the application storage area to a second memory address referring to the update storage area in which the update data is stored,
wherein after the update data is written into the update storage area, the switching takes place deterministically within a predefined update timeslot during runtime of the real-time application and without ending or restarting the real-time application.

12. A computer program product stored on a non-transitory computer readable storage medium, the computer program product including instructions for operating a network device for an automation network, the network device being set up with help of a real-time application for providing a function of the network device, the real-time application having at least one predefined, updatable parameter, the instructions being executable by one or more processors to:

store a first instance of the updatable parameter in an application storage area, wherein the updatable parameter comprises attack signatures, rule bases for a firewall, an intrusion detection system, or a combination thereof;

store a second instance of the updatable parameter in an update storage area, wherein the application storage area and the update storage area are separate from one another, and wherein the first and second instances of the updatable parameter are initially the same;

update the second instance of the updatable parameter by an update application, therein creating update data;

write the update data for the updatable parameter into the update storage area; and switch, at a predefined update time, a first memory address referring to the application storage area to a second memory address referring to the update storage area in which the update data is stored, wherein after the update data is written into the update storage area, the switch takes place deterministically within a predefined update timeslot during runtime of the real-time application and without ending or restarting the real-time application.

13. In a non-transitory computer-readable storage medium that stores a computer program with instructions executable by one or more processors to operate a network device for an automation network, which is set up with help of a real-time application for providing a function of the network device, the real-time application having at least one predefined, updatable parameter, the instructions comprising:

storing a first instance of the updatable parameter in an application storage area, wherein the updatable parameter comprises attack signatures, rule bases for a firewall, an intrusion detection system, or a combination thereof;

storing a second instance of the updatable parameter in an update storage area, wherein the application storage area and the update storage area are separate from one another, and wherein the first and second instances of the updatable parameter are initially the same;

updating the second instance of the updatable parameter by an update application, therein creating update data;

writing the update data for the updatable parameter into the update storage area; and switching, at a predefined update time, a first memory address referring to the application storage area to a second memory address referring to the update storage area in which the update data is stored, wherein after the update data is written into the update storage area, the switching takes place deterministically within a predefined update timeslot during runtime of the real-time application and without ending or restarting the real-time application.

14. The non-transitory computer-readable storage medium as claimed in claim 13, wherein the instructions further comprise storing, in a memory address table, the first memory address and the second memory address.

15. The non-transitory computer-readable storage medium as claimed in claim 13, wherein the instructions further comprise:

modifying an item of status information for a status of the update storage area after the update data is written into the update storage area; and switching the first memory address to the second memory address as a function of the item of status information.

16. The non-transitory computer-readable storage medium as claimed in claim 15, wherein the instructions further comprise protecting, with an access protection device, an access to the item of status information.

17. The non-transitory computer-readable storage medium as claimed in claim 16, wherein the access protection device comprises one or more semaphores.

18. The network device as claimed in claim 1, wherein the predefined update timeslot has a duration that is a function of an execution time of the update application.

* * * * *